United States Patent [19]

Nishizawa et al.

[11] Patent Number: 5,615,959
[45] Date of Patent: Apr. 1, 1997

[54] SERIAL PRINTER USING CARRIAGE FOR PAPER INSERTION

[75] Inventors: Katsuhiko Nishizawa; Osamu Koshiishi; Kouichirou Yokoyama, all of Nagano, Japan

[73] Assignee: Seiko Epson Corporation, Tokyo, Japan

[21] Appl. No.: 421,176

[22] Filed: Apr. 13, 1995

[30] Foreign Application Priority Data

Apr. 14, 1994 [JP] Japan ................... 6-100637
Feb. 24, 1995 [JP] Japan ................... 7-061633

[51] Int. Cl.$^6$ .................................... B41J 13/16
[52] U.S. Cl. ................. 400/279; 400/619; 400/708
[58] Field of Search .................... 400/279, 320, 400/322, 619, 624, 708, 314.1

[56] References Cited

U.S. PATENT DOCUMENTS

| | | | |
|---|---|---|---|
| 4,360,279 | 11/1982 | Sugiura | 400/600.2 |
| 4,498,795 | 2/1985 | Tatara | 400/637.1 |
| 4,569,611 | 2/1986 | Watanabe et al. | 400/624 |
| 4,775,254 | 10/1988 | Nakao et al. | 400/279 |
| 4,781,478 | 11/1988 | Eguchi | 400/279 |
| 4,802,778 | 2/1989 | Takahashi et al. | 400/624 |
| 4,976,555 | 12/1990 | Ueyama | 400/314.1 |
| 5,116,149 | 5/1992 | Yamasaki | 400/314.1 |
| 5,238,315 | 8/1993 | Kitabata | 400/314.1 |

FOREIGN PATENT DOCUMENTS

| | | | |
|---|---|---|---|
| 0228789 | 7/1987 | European Pat. Off. | 400/619 |
| 0400608 | 12/1990 | European Pat. Off. | 400/619 |
| 60-168533 | 8/1985 | Japan | 400/624 |
| 61-263780 | 11/1986 | Japan | 400/624 |
| 62-30068 | 2/1987 | Japan | 400/624 |
| 62-30069 | 2/1987 | Japan | 400/624 |

OTHER PUBLICATIONS

JP 62-284775 English Abstract.
JP 61-054971 English Abstract.

*Primary Examiner*—Edgar S. Burr
*Assistant Examiner*—Steven S. Kelley
*Attorney, Agent, or Firm*—Stroock & Stroock & Lavan

[57] ABSTRACT

A serial printer for printing on a recording medium which includes a platen, a carriage and a recording medium discharge section. The platen serves as a recording medium insert member and is rotated by a motor. A carriage shuttles in parallel with the platen and includes a recording head and a paper holder attached thereto. The sheet discharge section is arranged on a downstream side of the carriage and is provided for guiding the recording medium to a sheet discharge outlet. The printer further includes a carriage controller for moving the carriage towards the center of the recording medium and stopping the carriage proximate the center of the recording medium, while decelerating the carriage before the center of the recording medium, when the recording medium is forwarded for printing until the recording medium reaches a sheet discharge section from a predetermined position on the downstream side of the paper holder. A forward controller is provided for starting a recording medium forward operation for a single line of the recording medium in sync with the deceleration of the carriage. The carriage controller further moves the carriage proximate the center of the recording medium upon turning on the printer. The carriage controller also moves the carriage proximate the center of the recording medium when a print operation on the recording medium has ended.

5 Claims, 5 Drawing Sheets

SERIAL PRINTER USING CARRIAGE FOR PAPER INSERTION

BACKGROUND OF THE INVENTION

The present invention relates to a serial printer for printing and, in particular, to a serial printer which prints the first line of a recording sheet.

When printing on a recording sheet in a serial printer, not only must the recording sheet be inserted along the platen, but the print operation must also be done from the top end of the recording sheet. More specifically, a serial printer has a sheet discharge section on the downstream side of a position of a sheet forward path thereof, the position confronting both the recording head and the platen. The sheet discharge section has sheet discharge ribs and sheet discharge rollers. The sheet discharge section not only assists the recording sheet to be maintained in a predetermined position with respect to the platen for printing, irrespective of the rigidity of the recording sheet, but also discharges the printed recording sheet.

However, in a portion of the sheet forward path, where the top end of the recording sheet reaches the sheet discharge section, the recording sheet projects toward the recording head due to the rigidity thereof. As the sheet continues to move forward while so projected, the top end of the recording sheet lifts up and abuts against the sheet discharge section. The projection of the recording sheet causes a paper jam in the printer. To overcome this problem, various recording sheet insertion techniques have been proposed.

For example, as disclosed in Unexamined Japanese Patent Publication No. Sho. 56-144983, the carriage is brought to the center of the platen and the recording sheet is fed upon operation of a sheet insertion key. In addition, the paper bail is opened. Based on this arrangement, the following operation occurs: (1) the centering of carriage is ended before the recording sheet reaches the paper bail, (2) the paper bail is closed to the original position when the recording sheet is inserted between the paper bail and the platen, and (3) the recording sheet feed operation is stopped. The carriage is thereafter reset to the home position to start printing.

Based on this operation, the center of the recording sheet can be guided by the carriage, which to some extent prevents jamming of sheets. However, one problem with this arrangement is that after the sheet insertion key is operated, the carriage is moved to the center in order to move the recording sheet guide position. This operation takes additional time and affects the timing and reliability of the sheet insertion key operation. There are other problems. First, the printer becomes costly because the paper bail and the mechanism for opening and closing the paper bail are required. Second, the top margin must be set to a large value, because a recording sheet zone between the paper bail and the recording head cannot be printed. Third, a high performance control means and a large capacity power supply are required because the operations of centering the carriage, feeding the recording sheet, opening and closing the paper bail, and a like operation are performed simultaneously. In addition, a high performance controller and a large capacity power supply are required. Such factors also elevate the cost of manufacture.

To overcome the above-noted problems, a number of printers have been proposed. For example, as disclosed in Unexamined Japanese Patent Publication No. Sho. 58-63486, the carriage is moved to the center of the recording sheet upon reception of a set of instructions; the recording sheet is forwarded to the print start position; and the carriage is returned to the original position to start printing when the operation of inserting the recording sheet has been completed.

In Unexamined Japanese Patent Publication No. Sho. 61-233569, the printer is arranged to move the carriage to the center of the recording sheet so that the carriage can guide the recording sheet while forwarding the recording wheel to the print start position upon operation of the sheet insertion button. Then, the operation of inserting the recording sheet has ended. After that, the operation of printing a single line is performed by moving the carriage along the recording sheet. When a single line printing is accomplished, the carriage is moved again to the center of the recording sheet. Then, a line feed operation is carried out. These steps of the printing, the carriage centering and line feeding are repeated until the top end of the recording sheet reaches the paper guide.

In Unexamined Japanese Patent Publication No. Sho. 61-263780, the recording sheet is forwarded by performing the line feed operation with the recording head moved to the center of the recording sheet from the print end position until several lines in the top margin of the recording sheet reach the guide section.

Based on the above printers, the cost of manufacturing may be reduced to such a degree as to permit, for example, a paper bail. However, because the line feed operation is still performed after the recording head is moved to the center of the recording sheet, the printing throughput is reduced in proportion to the time required for moving the carriage to the center. In addition, because a zone in the center of the recording head which is guided by the carriage is limited to the size of the carriage, the recording sheet is likely to be jammed.

Accordingly, it is desired to provide a printer which is capable of reliably introducing the top end of a recording sheet to the printer by increasing the guide zone in the center of the recording sheet, while improving the total print speed from sheet insertion to print end.

SUMMARY OF THE INVENTION

Generally speaking, in accordance with the invention, a serial printer for printing on a recording medium including a platen, a carriage and a recording medium discharge section, is provided. The platen serves as a recording medium insert member and is rotated by a motor. The carriage shuttles in parallel with the platen and includes a recording head and a paper holder attached thereto. The sheet discharge section is arranged on a downstream side of the carriage and is provided for guiding the recording medium to a sheet discharge outlet. The printer further includes a carriage controller for moving the carriage towards the center of the recording medium and stopping the carriage at the center of the recording medium, while decelerating the carriage before the center of the recording medium, when the recording medium is forwarded for printing until the recording medium reaches a sheet discharge section from a predetermined position on the downstream side of the paper holder. A forward controller is provided for starting a recording medium forward operation for a single line of the recording medium in sync with the deceleration of the carriage. The carriage controller further moves the carriage to the center of the recording medium upon turning on the power supply. The carriage controller also moves the carriage to the center of the recording medium when a print operation on the recording medium has ended.

Accordingly, it is an object of the invention to provide an improved serial printer.

It is another object of the invention to provide a serial printer that has improved throughput.

Yet another object of the invention is to provide a serial printer which shortens the recording sheet insertion time.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
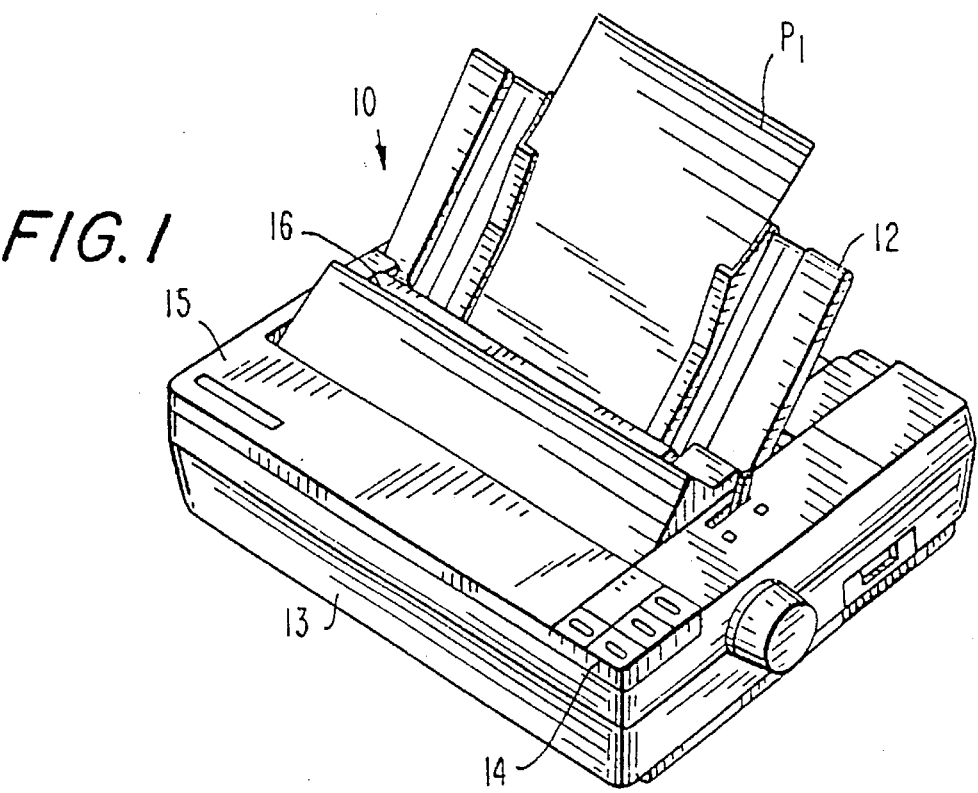
FIG. 1 is a perspective view of a serial printer in accordance with the invention.

Reference is first made to FIG. 1 which illustrates a serial printer, generally indicated at 10, and constructed in accordance with the invention. Printer 10 includes an upper surface case 13 and a sheet guide 12. Sheet guide 12 guides a cut sheet P1 to a sheet feed inlet. Upper surface case 13 includes a control panel 14 having switches and a cover 15. On the rear end of cover 15 is a sheet discharge outlet 16.

Figure 2:
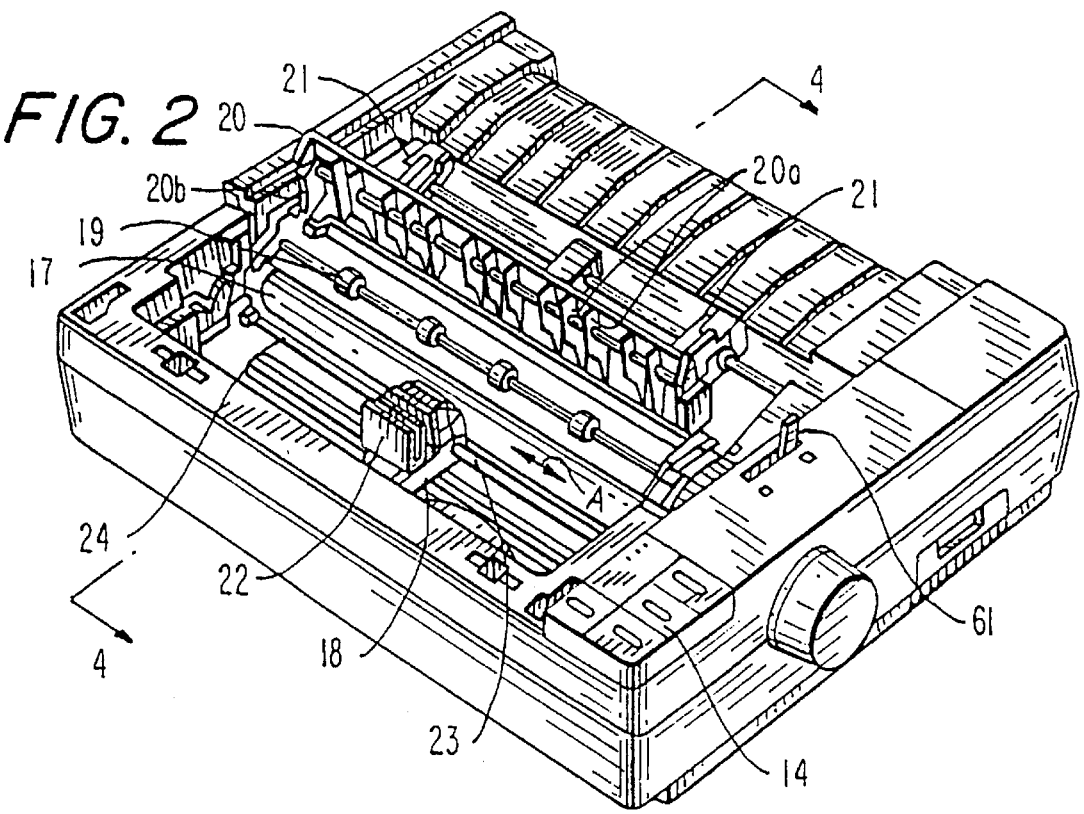
FIG. 2 is a perspective view of the serial printer with a sheet guide and a cover removed and with a sheet discharge unit cover opened.
Figure 3:
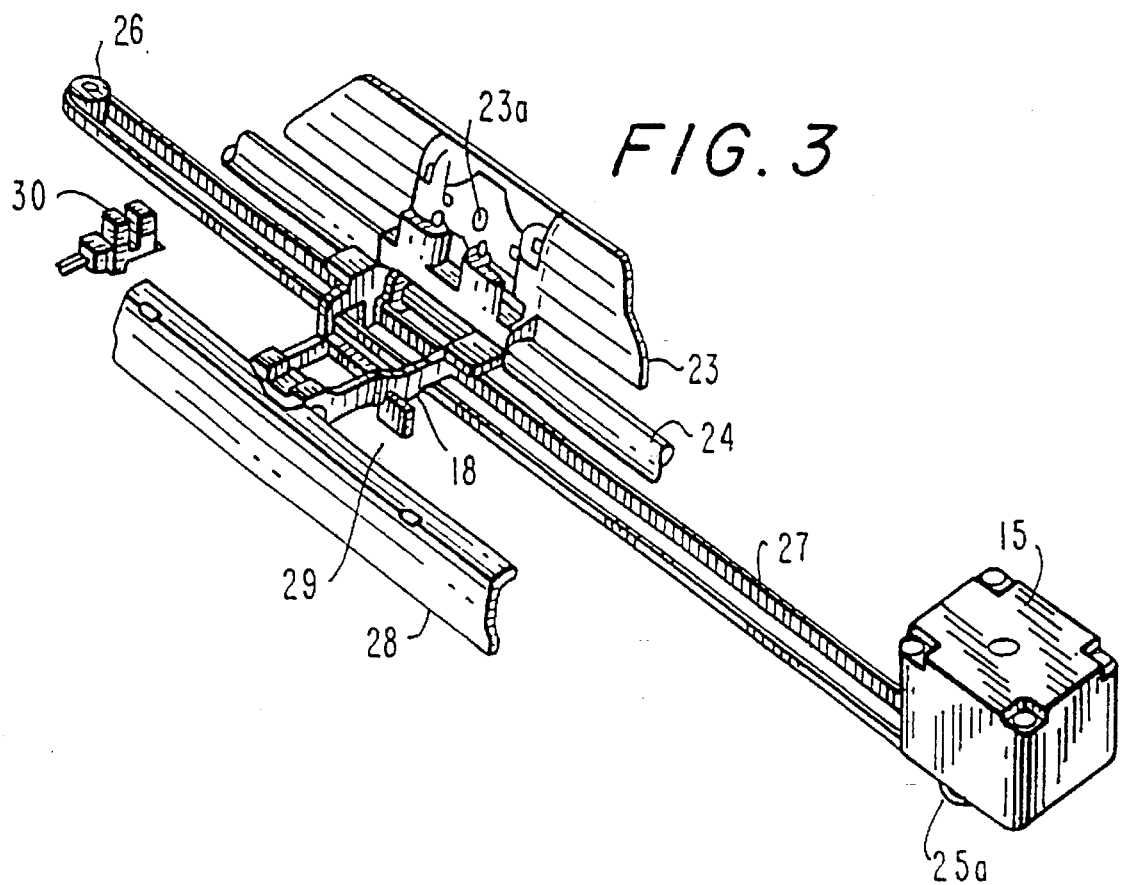
FIG. 3 is a perspective view a carriage of the serial printer.

FIG. 2 depicts the internal construction of printer 10 with sheet guide 12 and cover 15 removed therefrom. A sheet discharge unit cover 20 is provided and is opened by turning sheet discharge unit cover 20 about a pivot 20b. Positioned below sheet discharge unit cover 20 is a platen 17, a carriage 18, and sheet discharge rollers 19. Platen 17 is driven by a sheet forward motor 36. Carriage 18 shuttles back and forth in the directions of arrow A, while being guided by a guide member 24. Guide member 24 is arranged in parallel with platen 17. Sheet discharge rollers 19 are located both along a sheet forward path and on the downstream side of carriage 18 and are also parallel with platen 17. Sheet discharge unit cover 20 is interposed between carriage 18 and discharge rollers 19 along the sheet forward path.

Figure 4:
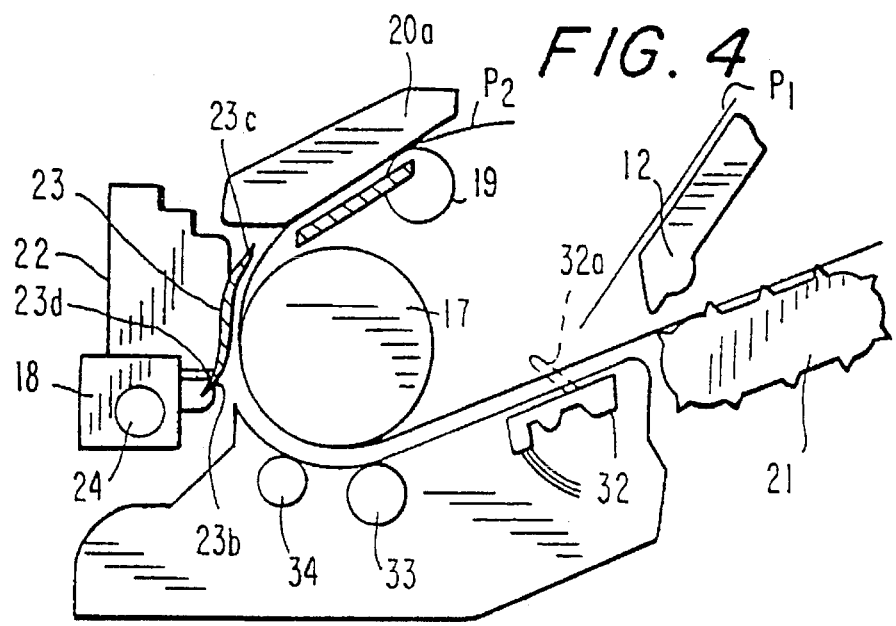
FIG. 4 is an enlarged sectional view taken along lines 4—4 of FIG. 2.

With reference also to FIG. 4, on one side of sheet discharge unit cover 20, which confronts platen 17, are a plurality of ribs 20a. Ribs 2a guide cut sheet P1 or a continuous sheet P2 from a recording head 22 to sheet discharge rollers 19. Ribs 2a form a sheet discharge section together with sheet discharge rollers 19. On the upstream side of platen 17 along the sheet forward path is a tractor assembly 21 that drives continuous sheet P2 through printer 10.

Carriage 18 not only carries recording head 22, but also includes a paper holder 23 and a detecting plate 29. Paper holder 23 confronts platen 17 as shown in FIG. 4. Paper holder 23 is substantially trapezoidal in shape with the lower portion thereof being wider. Detecting plate 29 operates in conjunction with a home position detector 30, which will be described in greater detail below. Paper holder 23 includes a window 23a that allows dot forming elements of recording head 25 (e.g., impact wires) to be projected therefrom. Lower end 23b of paper holder 23 is bent outward so that the top end of cut sheet P1 or the continuous sheet P2 is readily received. Carriage 18 is attached to a timing belt 27, which is spanned between the shaft of a carriage motor 25 and an idler 26. Carriage 18 is designed so as to be able to shuttle in parallel with platen 17 by guide member 24 and a base frame 28, which serves as a guide member.

A switching lever 61, as shown in FIG. 2, is provided for switching between a cut sheet mode and a continuous sheet mode. The movement of switching lever 61 is detected by a microswitch (not shown) or the like. In the cut sheet mode, sheet feed rollers 33, 34, which will be described in greater detail below, are in pressure contact with platen 17 so that the motive power of sheet forward motor 36 is not transmitted to tractor assembly 21. However, in the continuous sheet mode, sheet feed rollers 33, 34 are moved away from platen 17 so that the motive power of the sheet forward motor 25 is transmitted to tractor assembly 21. A home position detector 30 is provided and is in a confronting relationship with detecting plate 29, when recording head 22 is set to a home position.

The mechanism for feeding cut sheet P1 and continuous sheet P2 in printer 10 is depicted in FIG. 4. A sheet detector 32 is arranged on the upstream side of the sheet feed path. Sheet detector 32 is positioned so that a lever 32a thereof projects toward a cut sheet P1 or continuous sheet P2 moving path. When lever 32a is driven in a downward direction by the top end of cut sheet P1 or continuous sheet P2, sheet detector 32 outputs a signal.

Positioned on the downstream side of sheet detector 32 along the sheet forward path are sheet feed rollers 33, 34. Sheet feed rollers 33, 34 forward cut sheet P1 toward recording head 12. On the downstream side of sheet feed rollers 33, 34 with paper holder 23 interposed therebetween are ribs 2a of sheet discharge unit cover 20. Ribs 2a are located so as to bridge the gap between paper holder 23 and sheet discharge rollers 19. While FIG. 4 depicts the condition in which the continuous sheet P2 is being forwarded, sheet feed rollers 33, 34 do not make contact with platen 17. However, sheet feed rollers 33, 34 are in pressure contact with platen 17 to forward cut sheet P1.

When the cut sheet P1 is fed manually through the sheet guide 22 or a cut sheet feeder (not shown), or when continuous sheet P2 is fed by tractor assembly 21 through printer 10, a signal is outputted from sheet detector 32. Platen 17 is then driven by this signal. Cut sheet P1 is then forwarded towards recording head 22 by frictional force caused between platen 17 and sheet feed rollers 33, 34, or the continuous sheet P2 is forwarded towards recording head 22 by tractor assembly 21.

Based on the above arrangement, the top of cut sheet P1 or continuous sheet P2 is set to the print start position by paper holder 23 attached to carriage 18. This positioning is a result of carriage 18 moving and remaining at the center of the sheet as viewed in the sheet width direction. Carriage 18 stays thereat immediately after a power switch is turned on, or when a printed sheet is discharged. Thereafter, cut sheet P1 or continuous sheet P2 is directed towards ribs 2a of sheet discharge unit cover 20, while alternately repeating the print operation. The sheet forwarding operation will be described in greater detail below. These operations are usually controlled by a controller constructed of a microcomputer or computer, generally indicated as 40 in FIG. 5.

Figure 5:
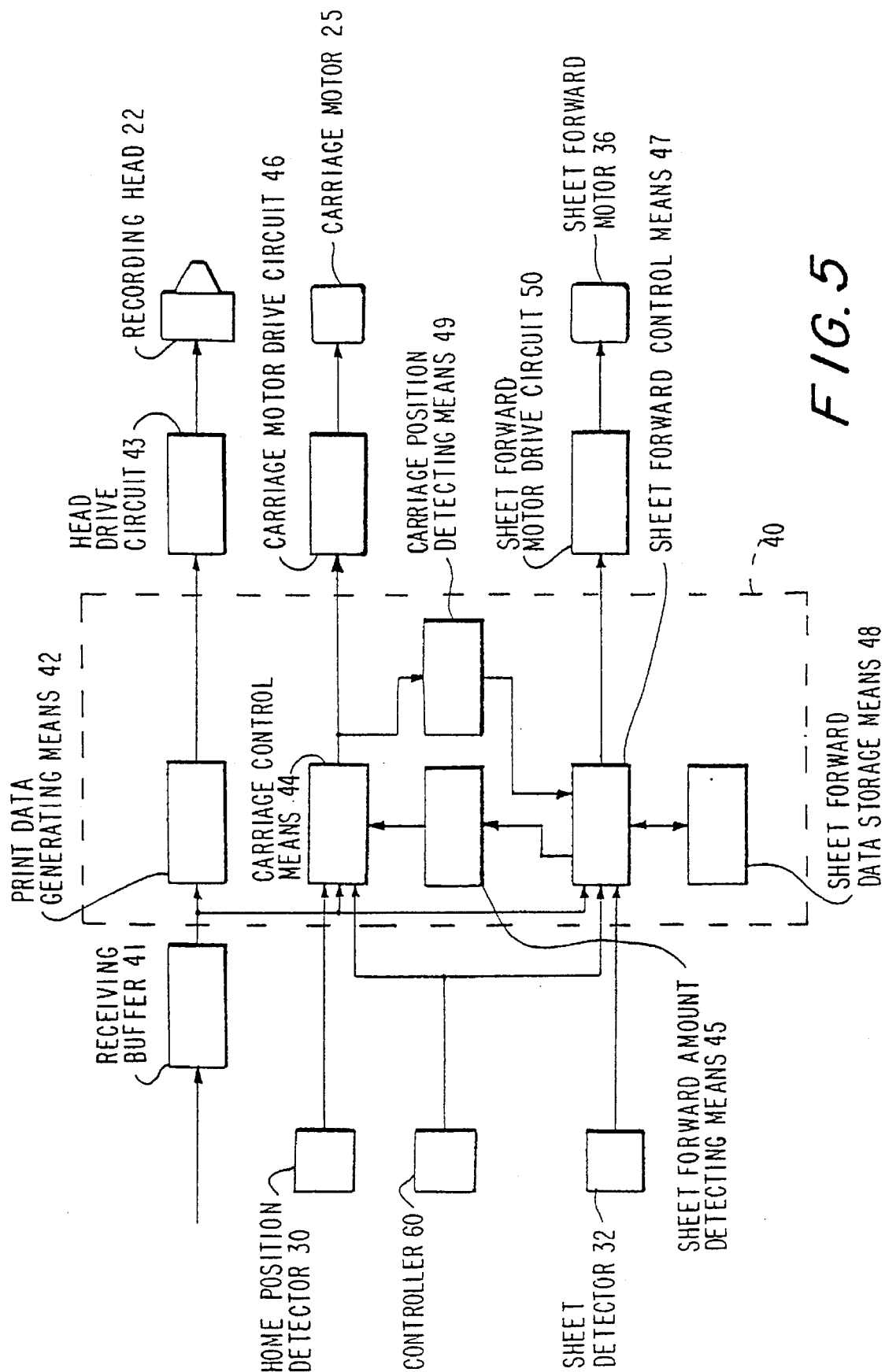
FIG. 5 is a block diagram of a printer control device constructed in accordance with the invention.

Reference is now made to FIG. 5 which depicts a receiving buffer 41, which receives print data from a host, and sends the data to a print data generator 42. Print data generator 42 converts print data out of the print data and control command data inputted to the receiving buffer 41 into bit map data. The bit map data then drives the recording head 22 and outputs the converted data to a head drive circuit 43.

A carriage controller 44 controls a carriage motor control drive circuit 46. Carriage controller 44 controls the movement of carriage 18 to the center, when the power supply is turned on and when the recording sheet has been discharged. Carriage controller 44 also controls the movement of carriage 18 toward the center of the recording sheet from the position at which the print operation ends until the top end of the recording sheet is introduced to ribs 20a. Carriage 18 is then decelerated to a stop position as it moves towards the center of the recording sheet. This movement is in part based on data from a sheet forward amount detector 45, which will be described in greater detail below. Sheet forward amount detector 45 detects an integrated sheet forward amount N from a TOF. When a new recording sheet is inserted into the printer, TOF is the position at which a first line can be printed after being reset.

A sheet feed controller 47 performs the sheet forward operation to the print start position and line feed operation. A line feed is defined by an amount M, representing a single line feeding after a single line is printed. Further, sheet feed controller 47 performs the sheet forward operation in the backward direction. The sheet is driven in a backward direction to rectify additional slack existing in a manually inserted sheet or the sheet forwarding operation for a single line for a predetermined zone at a predetermined position and at a predetermined timing as shown in a flowchart which will be described greater detail below. Sheet feed controller 47 is operated based on data from a carriage position detector 49 and data from a sheet forward data storage member 48, which will also be described in greater detail below. This data usually indicates that the top end of recording sheet P1 or P2 is guided into ribs 2a of the sheet discharge section.

The sheet forward data storage member 48 stores a sheet forward amount C2, an integrated sheet forward amount C3, and a position C4, as shown in Table 1 below:

TABLE 1

| Control Factor | Sheet is drawn backward by the integrated sheet forward amount N from TOF while N is less than C2 | Centering operation is carried out while integrated sheet forward amount N is less than C3 | Sheet Start Position C4 (in digits) |
| --- | --- | --- | --- |
| Sheet Feed Method | C2 | C3 | C4 |
| Manual Insertion | 250 | 600 | 40 |
| CSF | 250 | 600 | 40 |
| Tractor | 0 | 600 | 35 |

The sheet forward amount C2 is a standard by which a sheet forward operation in the backward direction is performed. Sheet forward amount C2 typically occurs at the time of feeding a recording sheet that is susceptible to slack. Such a recording sheet is a cut sheet that is either manually inserted or fed from a cut sheet feeder ("CSF"). The integrated sheet forward amount C3 is a standard integrated sheet forward amount from TOF. At this time, the sheet must be forwarded while carriage 18 is moving close to the center when the sheet has been fed manually, by the CSF, or by the tractor assembly. The position C4 is a standard carriage position for determining a sheet forward start timing until the integrated sheet forward amount from TOF reaches the standard C3. Each type of paper has an optimal centering position specific thereto so as to prevent jamming as set forth in Table 2 below:

TABLE 2

| | | | CENTERING POSITION (digits) |
| --- | --- | --- | --- |
| CUT SHEET | BOND PAPER | (L → R) | XXΔOOOOOOOOΔXX |
| | | (R → L) | XXΔOOOOOOOOΔXX |
| | ENVELOPE | (L → R) | XXΔOOOΔ |
| | | (R → L) | XXΔOOOOOΔ |
| CONTINUOUS SHEET | 4"/70 kg | (L → R) | XΔOOOOOOOΔX |
| | | (R → L) | ΔOOOOOOΔX |
| | 10"/70 kg | (L → R) | XΔOOOOOOOOOOOOΔXX |
| | | (R → L) | ΔOOOOOOOOOOOOΔXX |
| | 4"/3-sheet FANFOLD | (L → R) | XΔOOOOOOOX |
| | | (R → L) | XΔOOOOOOOX |

30  35  40  45

Table 2 discloses a non-exhaustive list of paper types available including cut sheets such as bond paper and envelopes or continuous sheets, such as a 4"/70 kg type, 10"/70 kg type, 4"/3-sheet fanfold type, and the like. Therefore, the aforementioned sheet forward start carriage position C4 is determined for every type of sheet (i.e., whether cut sheet or continuous sheet) based on the optimal centering position data.

Figure 6:
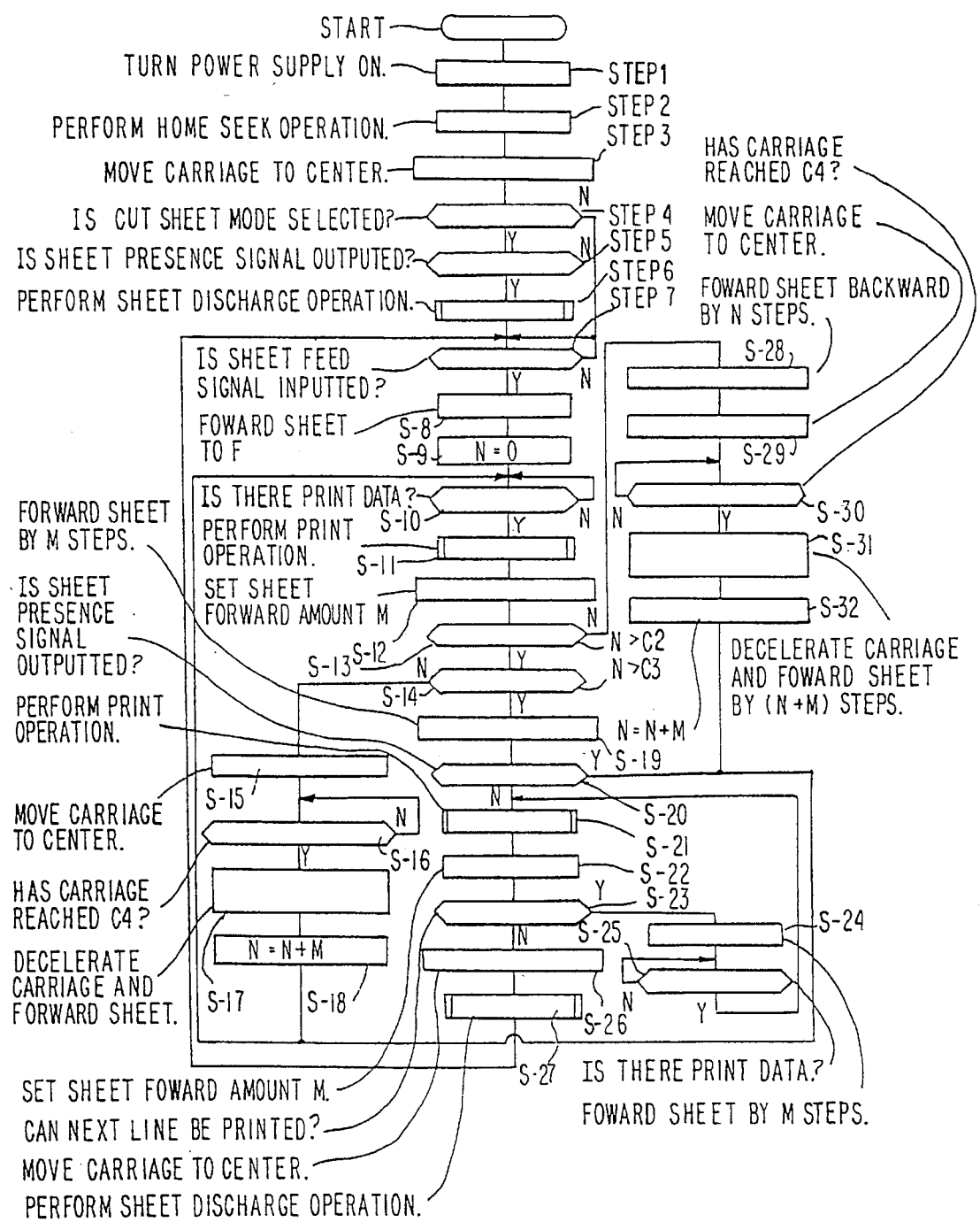
FIG. 6 is a flow chart of the processing of a CPU in accordance with the control device of the invention.

Reference is now made to FIG. 6, which discloses the printing operation of printer 10. In this first example, a continuous sheet mode is selected by switching lever 61. When the power supply has been turned on at a Step 1, carriage 18 performs the home seek operation at a Step 2. Thereafter, carriage 18 moves to the center of a continuous sheet at a Step 3.

Therefore, the printer waits for the input of a sheet feed signal at Step 7. When the continuous sheet feed operation is started by tractor assembly 21, the top end of the continuous sheet is forwarded up to the position ("TOF"). At this time carriage 18 is already positioned at the center, while the sheet is being guided by paper holder 23 at a Step 8.

Upon passage of the top end of the continuous sheet past sheet detector 32, a signal is outputted from sheet detector 32. Sheet forward controller 47 performs the sheet forward operation from this position to a predetermined position so that the continuous sheet can reach the position at which the first line can be printed. Under this condition, sheet forward amount detector 45 resets integrated sheet forward amount N at a Step 9. When print data is present, carriage 18 is then moved to the print start position from the center of the continuous sheet at a Step 10. The print operation is then performed at a Step 11.

Upon completing the printing of a single line, sheet forward controller 47 sets the sheet forward amount M for a single line required for printing next print data at a Step 12. Sheet forward controller then judges the integrated sheet forward amount N from TOF at a Step 13 to determine if it is a value greater than C2. In this example, the continuous sheet mode is selected using the tractor assembly, the standard value C2 for rectifying the sheet having slack is set to zero and sheet forward controller 47 will determine if the integrated sheet forward amount N from TOF is a value greater than C3 at a Step 14.

Figure 7A:
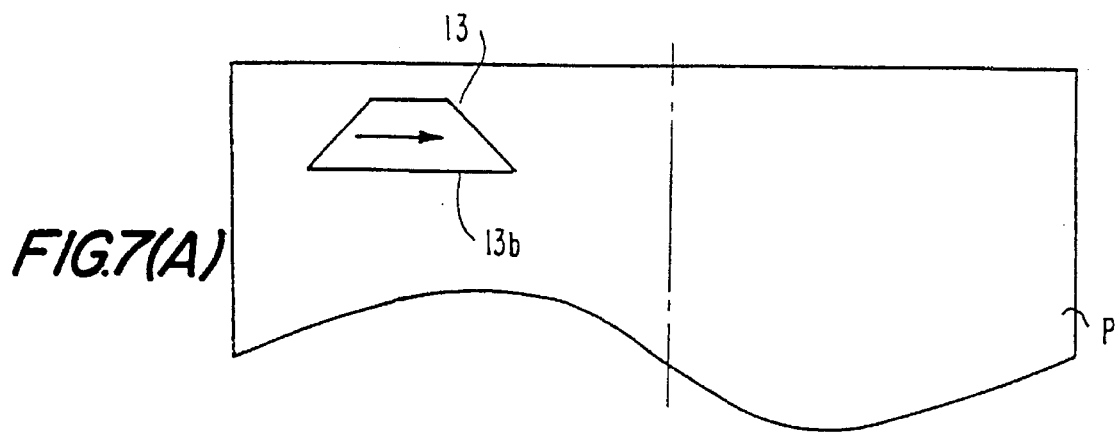
FIGS. 7 (A), 7(B), and 7(C) are diagrams illustrating the operation of the serial printer in accordance with the invention.
Figure 7B:
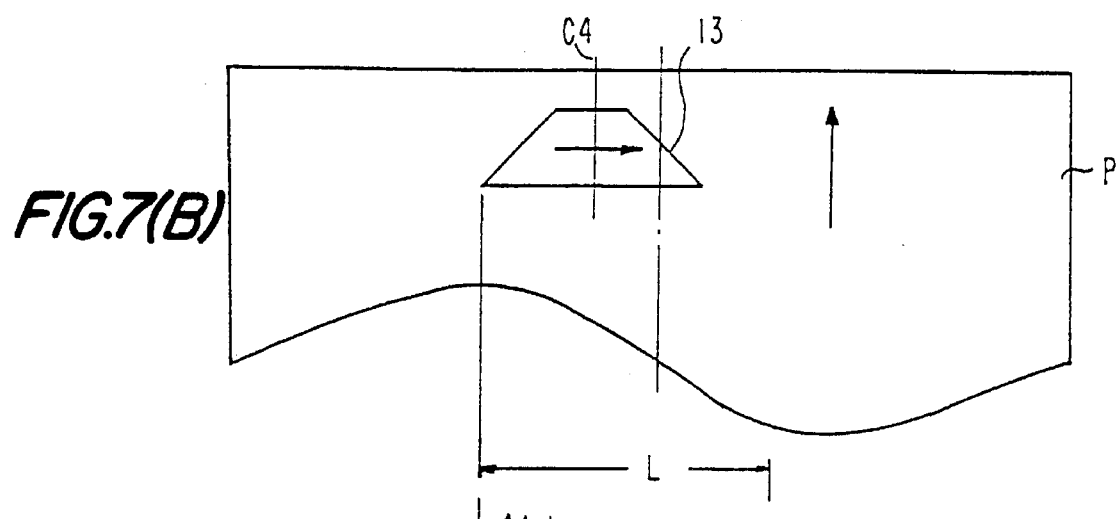

Because the integrated sheet forward amount N has not yet reached the standard value C3, (i.e., 600 steps with only the first line having been printed at Step 14), carriage controller 34 moves carriage 18 towards the center of the continuous sheet an amount M at a Step 15 as shown in FIG. 7(A). When carriage 18 reaches the predetermined standard position C4, (i.e., 35±66 digits, where ΔC is the tolerance) at a Step 16, carriage controller 44 decelerates carriage 18 and sheet forward controller 47 starts the sheet forward operation for M steps at a Step 17 as shown in FIG. 7(B).

Figure 7C:
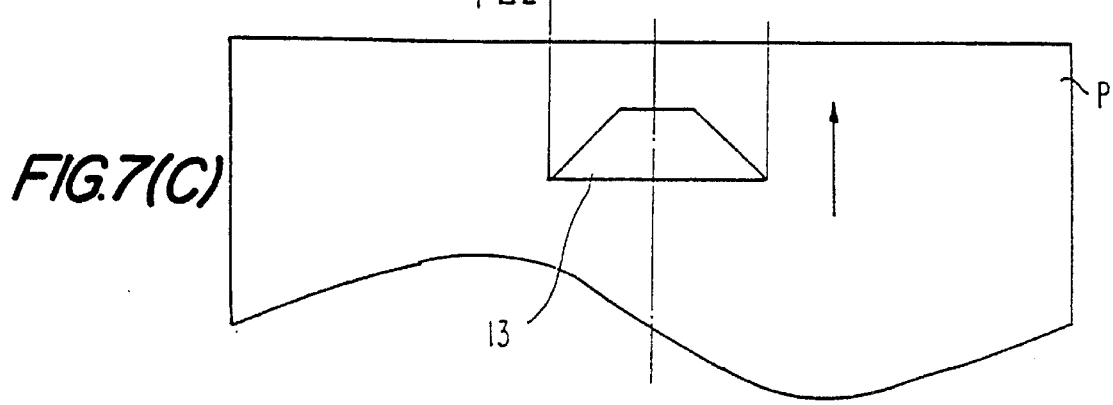

Since the sheet forward operation for a single line is performed while carriage 18 is moving, contact friction between paper holder 23 and the continuous sheet at the initial stage of the sheet forward operation is reduced compared with that of paper holder 23 at a rest position. In addition, as shown in FIG. 7(B), the continuous sheet may be moved to the sheet discharge section as shown in FIG. 7(C) smoothly, because the zone of the continuous sheet biased by paper holder 23 is increased by ΔL from the length L of the paper holder 23. In addition, because the sheet forward operation is performed without waiting for carriage 18 arrive to the center, the throughput of the recording apparatus is improved with respect to at least speed and efficiency.

Upon the completion of the sheet forward operation for a single line, a sum (N+M), obtained by adding the current sheet forward amount M to the integrated sheet forward amount N as the integrated sheet forward amount N, is stored in the sheet forward amount detector 45 at a Step 18.

If there is print data at Step 10, then the print operation for a next line is performed at Step 11.

Upon the completion of printing the line, the sheet forward amount M for a next line is set at Step 12. Next, the total sheet forward amount N from TOF in the sheet forward amount detector 45 is compared with the standard value C3 at Step 14. As set forth above, if the total sheet forward amount N from TOF does not exceed the standard value C3, Steps 15 to 18 will be repeated.

When the total sheet forward amount N from TOF in the sheet forward amount detector 45 exceeds the standard value C3 as the print operation progresses at Step 14, sheet forward controller 47 performs the sheet forward operation for a single line irrespective of the position of carriage 18 at a Step 19. If print data exists at the time this sheet forward operation has ended at Step 10, then the print operation for a next line will be performed at Step 11. Accordingly, if a sheet presence signal is outputted from sheet detector 32, the above printing process is repeated at Step 20.

On the other hand, if the sheet presence signal from sheet detector 32 is stopped at Step 20, the print operation is performed at a Step 21, and the sheet forward amount M is set at a Step 22. When at least one line printable area remaining at the trailing area of the sheet at a Step 23, the sheet forward operation for M steps is performed at a Step 24. If print data exists at a Step 25, the print operation is performed at a Step 21. On the other hand, if the print operation for a next line is not possible at Step 23, when the sheet forward amount M has been set at Step 22, carriage 18 is moved to the center at a Step 26 and the sheet discharging operation is preformed at Step 27.

In a second example, cut sheet mode is selected by switching lever 61, carriage controller 44 moves carriage 18 to home position (home seek operation) at Step 2 upon turning on the power supply at Step 1. Carriage 18 is then moved to the center of the cut sheet at Step 3 in a manner similar to that in the continuous sheet mode. When the cut sheet print mode is selected by switch lever 61 at Step 4, the presence of a sheet presence signal is checked. If the sheet presence signal is outputted at Step 5, then, after the remaining recording sheet is discharged at Step 6, the printer waits for the input of a sheet feed signal at Step 7. If the sheet presence signal is not outputted, the printer simply waits for the input of a sheet feed signal without performing any other operation at Step 7.

When a cut sheet is inserted manually or by a CSF under this condition, the top end of the cut sheet is forwarded up to the first line printing position (TOF), while guided by paper holder 23 of carriage 18. At this point, carriage 18 has been already positioned at the center of the sheet at Step 8. Sheet forward amount detector 45 resets the integrated sheet forward amount N under this condition at Step 9. Thereafter, carriage 18 moves to the print start position from the center of the cut sheet. If print data exists at Step 10, then the print operation is started at Step 11.

When the print operation for a single line has ended, sheet forward controller 47 sets the sheet forward amount M at Step 12 and compares the total sheet forward amount N from TOF with the standard value C2 at Step 13. At this moment, the total sheet forward amount N does not exceed the standard value C2. Therefore, the cut sheet is drawn backward by the total sheet forward amount N from TOF (i.e., 0 steps) by reversely driving sheet forward motor 36 at a Step 28.

Next, carriage controller 44 moves carriage 18 towards the center of sheet at a Step 29. As carriage 18 reaches the predetermined position C4 at Step 30, carriage controller 34 decelerates carriage 18, and sheet forward controller 47 forwardly drives sheet forward motor 36. This deceleration and forward motion enables the printer to perform the sheet forward operation for (M+N) steps (i.e., drawing back steps +single line forward steps) at a Step 31. Accordingly, the slack in the cut sheet can be eliminated, which in turn allows a correct sheet forward operation to be performed.

When the sheet forward operation for a single line is completed, the data N in the sheet forward amount detector 45 is updated at a Step 32. Thereafter, the print operation for a second line is performed at Step 10. From the second line onward, the operation of drawing the cut sheet back by the total sheet forward amount N from TOF is performed by reversely driving sheet forward motor 36 at Step 28 until the data N in sheet forward amount detector exceeds C2 at Step 13. The total sheet forward amount N being N=M steps in this case, or N=N+M =2M steps in the case of a third line, and so on.

Then, carriage controller 44 moves carriage 18 toward the center of the cut sheet at Step 29. As the carriage 18 reaches the predetermined position C4 in Step 30, carriage controller 44 decelerates carriage 18, and sheet forward controller 47 forwardly drives sheet forward motor 36 so that the printer performs the sheet forward operation for (M+N) steps (i.e., drawing back steps +single line forward steps) at Step 31.

Based on this printing operation, the contact friction between paper holder 23 and the cut sheet at the initial stage of the sheet forward operation is reduced compared with that with paper holder 23 at a rest position. In addition, the cut sheet may be moved to the sheet discharge section as shown in FIG. 7(C) smoothly, because the zone of the cut sheet biased by paper holder 23 is increased by ΔL from the length L of paper holder 23 as shown in FIG. 7(B).

Upon the completion of the sheet forward operation, the data N in the sheet forward amount detector 45 is updated to N=N+M at a Step 32. Thereafter, the print operation for a next line is performed at Step 10. When the data N in the sheet forward amount detector exceeds C2 at Step 13, the sheet forward operation only in the forward direction is performed without performing the operation of drawing the cut sheet backward. Carriage controller 44 moves carriage 18 toward the center of the cut sheet until the data N in the sheet forward amount detector 45 exceeds the standard value C3 as described above with respect to Step 15. Upon reaching the standard position C4, carriage 18 is decelerated. At the same time, sheet forward controller 47 forwardly drives the sheet forward motor 36. This driving enables the printer to perform the cut sheet forward operation for a single line at Step 17.

When the data N in the sheet forward amount detector 45 exceeds the standard value C3 as the print operation progresses at Step 14, and if a sheet presence signal is outputted from sheet detector 32, the aforementioned process is repeated from Step 10. On the other hand, when sheet presence signal from the sheet detector 32 is stopped at Step 20, the print operation is performed at Step 21, and the sheet forward amount M is set at Step 22. If the print operation for a next line is possible at Step 23, the sheet forward operation for M steps is performed at Step 24. Thereafter, if print data exists at Step 25, the print operation is performed. On the other hand, when M steps are set as the sheet forward amount at Step 22, then print operation for the next line is not possible at Step 23. Therefore, carriage 18 is moved to the center at Step 26 to start the sheet discharge operation at Step 27. When a cut sheet for printing a next page is inserted, the top end of the cut sheet is forwarded to TOF. Then, the carriage 18 is already located at the center position. Therefore, the additional time for moving carriage 18 to the center is not required, which in turn improves the throughput.

Based on the above arrangement, the invention is characterized as including a carriage controller for moving a carriage toward the center of a recording sheet and stopping the carriage at the center of the recording sheet, while decelerating the carriage before the center of the recording sheet. A sheet forward controller starts the sheet forward operation for a single line of the recording sheet in sync with the deceleration of the carriage. This movement occurs when the recording sheet is forwarded until the recording sheet reaches the sheet discharge section from a predetermined position on a downstream side of the paper holder. The carriage controller is further provided for moving the carriage to the center of the recording sheet upon turning on a power supply. The carriage controller also moves the carriage to the center of the recording sheet, when a print operation on the recording sheet has been ended.

The printer includes a platen that serves as a recording sheet inserting member. The platen is driven to rotate by a motor. The printer also includes a carriage, which shuttles in parallel with the platen and includes a recording head and a paper holder attached thereto. A sheet discharge section is positioned in the printer and is arranged on a downstream side of the carriage for guiding the recording sheet to a sheet discharge outlet.

Since the carriage has already been centered upon input of a sheet feed signal, the recording sheet can be fed immediately thereafter. Until the top end of the recording sheet enters into the sheet discharge section, the sheet forward operation for printing is performed while the paper holder is moving toward the center of the recording sheet. Therefore, the recording sheet can enter into the sheet discharge guide member reliably with a wide top end zone of the recording sheet biased by the paper holder.

Accordingly, the sheet forward operation for printing is performed while the paper holder is moving toward the center of the recording sheet until the top end of the recording sheet enters into the sheet discharge section. This simultaneous movement allows the recording sheet to be reliably introduced into the sheet discharge section with a wider top end zone of the recording sheet biased by the paper holder. Therefore, the time required for inserting a next recording sheet can be saved and improved throughput can be obtained, because the carriage has already been located at the center of the recording sheet upon the end of the print operation. In addition, it is not necessary to wait for the carriage to move to the center, because the carriage has already been moved to the center of the recording sheet upon turning on the power supply. This allows the recording sheet inserting operation to be started upon giving an insertion command and therefore contributes to shortening the recording sheet insertion time.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling the printing of a portion of a recording medium, while inserting the recording medium into a printer, the printer including a platen, a carriage and a printing medium discharge section, the platen serving as a recording medium inserting member and being rotated by a motor, the carriage shuttling in parallel with the platen and having a recording head and a paper holder attached thereto, and the sheet discharge section arranged on a downstream side of the carriage for guiding the recording medium to a sheet discharge outlet, the method comprising the steps of:

moving the carriage toward a predetermined position and the center of the recording medium and stopping the carriage proximate the center of the recording medium;

decelerating the carriage before the center of the recording medium, when the recording medium is forwarded for printing until the recording sheet reaches the sheet discharge section from said predetermined position on a downstream side of the paper holder; and starting a recording medium forward operation when said carriage reaches said predetermined position for a single line of the recording medium in sync with the deceleration of the carriage.

2. The method of claim 1, further including the step of moving the carriage towards the center of the recording medium upon turning on said printer.

3. The method of claim 1, further including the step of moving the carriage towards the center of the recording medium when a print operation on the recording medium has ended.

4. The method of claim 2, further including the step of moving the carriage to the center of the recording medium when a print operation on the recording medium has ended.

5. The method of claim 1, wherein said predetermined position is determined based on the type of recording medium.

* * * * *